Figure 1:
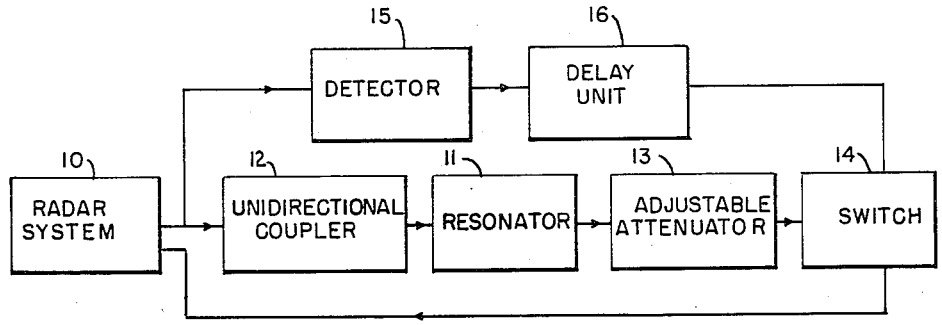

Dec. 25, 1956   J. J. OKRENT   2,775,759
TEST EQUIPMENT FOR A HIGH-FREQUENCY TRANSMITTER AND RECEIVER
Filed March 28, 1955

United States Patent Office 2,775,759
Patented Dec. 25, 1956

2,775,759

TEST EQUIPMENT FOR A HIGH-FREQUENCY TRANSMITTER AND RECEIVER

Jasper J. Okrent, Port Washington, N. Y., assignor to Hazeltine Research, Inc., Chicago, Ill., a corporation of Illinois Application March 28, 1955, Serial No. 497,286

5 Claims. (Cl. 343—17.7)

This invention relates to test equipment for a transmitter and receiver of repetitive bursts (pulses) of high-frequency energy and has particular application in equipment for testing radar systems.

Test equipment heretofore employed to test radar systems has ordinarily utilized a so-called echo box or high-Q resonator tuned to the high frequency (carrier frequency) of the energy developed by the radar transmitter for developing damped oscillations of a continuous wave nature which are applied from the resonator to the radar receiver to provide an indication of receiver sensitivity. However, since radar receivers utilize circuits especially designed to translate bursts of high-frequency energy or pulses derived therefrom, such receivers ordinarily respond to continuous wave signals in a manner different from their response to bursts of high-frequency energy. Accordingly, the application of a continuous wave signal to the receiver does not always provide an accurate test of the response of the receiver to energy bursts such as encountered during actual operation.

The transmitted high-frequency burst cannot be directly applied to the receiver because its amplitude is so great that it would damage the receiver which is adapted to translate energy bursts of much smaller amplitude. Also, the input circuit of the receiver is ordinarily effectively short-circuited during the development of the transmitted burst to prevent such damage. Further, it has heretofore been considered impractical to attempt to delay the transmitted energy at its carrier frequency by an amount corresponding to the transit time of pulses echoed from targets during actual operation because of the high operating frequency of microwave radar systems. Accordingly, it has heretofore been impractical to provide a completely satisfactory test equipment for radar systems of the type described.

It is an object of the present invention, therefore, to provide a new and improved test equipment for a transmitter and receiver of repetitive bursts of high-frequency energy and one capable of supplying delayed energy bursts to the receiver of the system.

In accordance with a particular form of the invention, test equipment for a transmitter and receiver of repetitive bursts of high-frequency energy comprises resonant means activated by the transmitted bursts for developing oscillations over extended periods and circuit means coupled to the resonant means and operatively synchronized with the transmitter for gating the oscillations to develop delayed bursts for application to the receiver.

For a better understanding of the present invention, together with other and further objects thereof, reference is had to the following description taken in connection with the accompanying drawing, and its scope will be pointed out in the appended claims.

Figure 2:
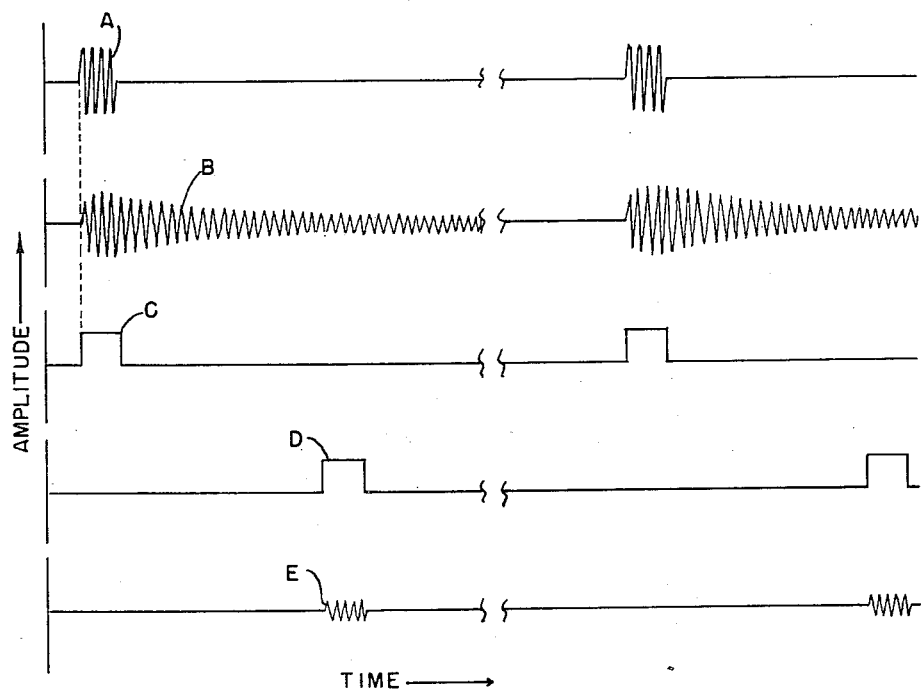

Referring to the drawing:

Fig. 1 is a schematic diagram representing a test equipment constructed in accordance with the invention and connected to a radar system, and Fig. 2 is a graph representing the signals developed at various points of the Fig. 1 equipment.

Referring now more particularly to the drawing, test equipment for a conventional radar system 10 including transmitter and receiver comprises a resonator 11 of conventional construction for developing oscillations at carrier frequency over extended periods and activated by the transmitted bursts of high-frequency energy supplied thereto by means of a unidirectional coupler 12 which may, for example, be at the lower radar frequencies a diode circuit which is so biased that it translates large amplitude signals but blocks the translation of small amplitude signals. The test equipment preferably includes an adjustable attenuator 13 of conventional type for attenuating the oscillations to a desired level. The adjustable attenuator 13 is coupled between the resonator 11 and high-frequency energy-translating means comprising an electronic switch 14 of conventional type for gating the oscillations to develop delayed bursts of high-frequency energy for application to the receiver of system 10.

The test equipment also includes pulse-developing means operatively synchronized with the radar transmitter for developing gating pulses gated from the transmitted bursts for controlling the operation of the switch 14. More particularly, the pulse-developing means preferably comprises an amplitude detector 15 responsive to the transmitted bursts for deriving low-frequency pulses therefrom and a delay unit 16 for delaying the low-frequency pulses with respect to the transmitted bursts. The delay unit 16 may, for example, comprise a delayed pulse generator comprising a so-called "one-shot" triggered multivibrator and differentiating circuit.

Considering now the operation of the test equipment just described with reference to the Fig. 2 graph, the various curves are presented to aid in explaining the operating principle and, accordingly, have been idealized. Curve A represents the repetitive bursts of high-frequency energy generated by the transmitter of the radar system 10 having the usual low-frequency repetition rate. These energy bursts are supplied through the unidirectional coupler 12 to the resonator 11 wherein they activate the resonator which develops oscillations represented by Curve B which ordinarily decay exponentially. These oscillations are attenuated by any desired factor in the attenuator 13 and applied to the switch 14. The coupler 12 prevents feedback from the resonator 11 to the radar system 10.

The energy bursts represented by Curve A are also supplied to the detector 15 which derives therefrom the pulse-modulation envelope represented by Curve C. The pulses represented by Curve C are applied to the delay unit 16 which, in response thereto, develops output pulses represented, for example, by Curve D and delayed with respect to the transmitter pulses of Curve A. The delay unit 16 applies the pulses represented by Curve D to the switch 14 to actuate the switch during the pulse intervals to cause translation to the radar receiver of high-frequency bursts derived from the oscillations developed by the resonator 11 and represented by Curve E. The pulses represented by Curve E are suitable for testing the receiver pulse-translating characteristics of the radar system 10.

There may also be provided a suitable detector and voltmeter (not shown) which may be switched between the transmitter and the receiver to provide an indication of the relative amplitudes of the transmitter bursts and the bursts supplied to the receiver which may be useful in testing over-all radar system operation.

From the foregoing description it will be apparent that test equipment constructed in accordance with the invention has the advantage of providing delayed bursts of high-frequency energy suitable for application to the receiver of a radar system for testing the receiver.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Test equipment for a transmitter and receiver of repetitive bursts of high-frequency energy comprising: resonant means activated by said transmitted bursts for developing oscillations over extended periods; and circuit means coupled to said resonant means and operatively synchronized with the transmitter for gating said oscillations to develop delayed bursts for application to the receiver.

2. Test equipment for a transmitter and receiver of repetitive bursts of high-frequency energy comprising: resonant means activated by said transmitted bursts for developing oscillations over extended periods; pulse-developing means operatively synchronized with the transmitter for developing gating pulses delayed from said transmitted bursts; and high-frequency energy-translating means coupled to said resonant means and said pulse-developing means for gating said oscillations to develop delayed bursts for application to the receiver.

3. Test equipment for a transmitter and receiver of repetitive bursts of high-frequency energy comprising: resonant means activated by said transmitted bursts for developing oscillations over extended periods; detector means responsive to said transmitted bursts for deriving low-frequency pulses therefrom; delay means for effectively delaying said low-frequency pulses with respect to said transmitted bursts; and high-frequency energy-translating means coupled to said resonant means and said delay means for gating said oscillations to develop delayed bursts for application to the receiver.

4. Test equipment for a transmitter and receiver of repetitive bursts of high-frequency energy comprising: resonant means activated by said transmitted bursts for developing oscillations over extended periods; means for attenuating said oscillations; pulse-developing means operatively synchronized with the transmitter for developing gating pulses delayed from said transmitted bursts; and high-frequency energy-translating means coupled to said attenuating means and said pulse-developing means for gating said oscillations to develop attenuated delayed bursts for application to the receiver.

5. Test equipment for a transmitter and receiver of repetitive bursts of high-frequency energy comprising: resonant means activated by said transmitted bursts for developing oscillations over extended periods; pulse-developing means operatively synchronized with the transmitter for developing gating pulses delayed from said transmitted bursts; and a high-frequency switch coupled to said resonant means and actuated by said gating pulses for translating to the receiver delayed bursts of said oscillations.

No references cited.